United States Patent
Kagan

(10) Patent No.: US 8,370,675 B2
(45) Date of Patent: Feb. 5, 2013

(54) PRECISE CLOCK SYNCHRONIZATION

(75) Inventor: Michael Kagan, Zichron Yaakov (IL)

(73) Assignee: Mellanox Technologies Ltd., Yokneam (IL)

( * ) Notice: Subject to any disclaimer, the term of this patent is extended or adjusted under 35 U.S.C. 154(b) by 722 days.

(21) Appl. No.: 12/618,730

(22) Filed: Nov. 15, 2009

(65) Prior Publication Data

US 2010/0189206 A1   Jul. 29, 2010

Related U.S. Application Data

(60) Provisional application No. 61/147,776, filed on Jan. 28, 2009.

(51) Int. Cl.
| | |
|---|---|
| G06F 1/12 | (2006.01) |
| G06F 15/16 | (2006.01) |
| G04C 11/00 | (2006.01) |
| H04L 7/00 | (2006.01) |
| H04J 3/06 | (2006.01) |

(52) U.S. Cl. .......... 713/400; 713/500; 368/46; 375/354; 709/248; 370/503

(58) Field of Classification Search .......... 713/400, 713/500, 502–503, 600; 368/46–47; 375/354–356; 709/248; 370/503, 509, 512
See application file for complete search history.

(56) References Cited

U.S. PATENT DOCUMENTS

| | | | | |
|---|---|---|---|---|
| 5,392,421 | A | * | 2/1995 | Lennartsson ................. 713/400 |
| 5,402,394 | A | * | 3/1995 | Turski ............................ 368/10 |
| 5,416,808 | A | * | 5/1995 | Witsaman et al. ............ 375/356 |
| 5,564,285 | A | * | 10/1996 | Jurewicz et al. ................ 62/127 |
| 5,896,524 | A | * | 4/1999 | Halstead et al. .............. 713/375 |
| 6,055,246 | A | * | 4/2000 | Jones ............................ 370/503 |
| 6,199,169 | B1 | * | 3/2001 | Voth .............................. 713/400 |
| 6,449,291 | B1 | * | 9/2002 | Burns et al. ................... 370/516 |
| 6,535,926 | B1 | * | 3/2003 | Esker ............................. 709/248 |
| 6,918,049 | B2 | * | 7/2005 | Lamb et al. ................... 713/500 |
| 7,111,184 | B2 | * | 9/2006 | Thomas et al. ............... 713/401 |
| 7,191,354 | B2 | * | 3/2007 | Purho ............................ 713/400 |
| 7,254,646 | B2 | * | 8/2007 | Aguilera et al. .............. 709/249 |
| 7,483,448 | B2 | * | 1/2009 | Bhandari et al. .............. 370/503 |
| 7,496,686 | B2 | * | 2/2009 | Coyle ............................ 709/248 |
| 7,535,933 | B2 | * | 5/2009 | Zerbe et al. ................... 370/516 |
| 7,623,552 | B2 | * | 11/2009 | Jordan et al. .................. 370/503 |
| 7,656,751 | B2 | * | 2/2010 | Rischar et al. .................. 368/46 |
| 7,941,684 | B2 | * | 5/2011 | Serebrin et al. ............... 713/400 |
| 8,065,052 | B2 | * | 11/2011 | Fredriksson et al. ........... 701/36 |
| 2002/0027886 | A1 | * | 3/2002 | Fischer et al. ................. 370/255 |
| 2006/0109376 | A1 | * | 5/2006 | Chaffee et al. ............... 348/423.1 |

OTHER PUBLICATIONS

IEEE Standard 1588™-2008: "IEEE Standard for a Precision Clock Synchronization Protocol for Networked Measurement and Control Systems", IEEE Instrumentation and Measurement Society, Revision of IEEE Standard 1588-2002, USA, Jul. 24, 2008.

Weibel et al., "Implementation and Performance of Time Stamping Techniques", 2004 Conference on IEEE 1588, Sep. 28, 2004.

\* cited by examiner

*Primary Examiner* — Tim T Vo
*Assistant Examiner* — Trisha Vu
(74) *Attorney, Agent, or Firm* — D. Kligler I.P. Services, Ltd.

(57) ABSTRACT

A method for clock synchronization includes computing an offset value between a local clock time of a real-time clock circuit and a reference clock time, and loading the offset value into a register that is associated with the real-time clock circuit. The local clock time is then summed with the value in the register so as to give an adjusted value of the local clock time that is synchronized with the reference clock.

11 Claims, 3 Drawing Sheets

PRECISE CLOCK SYNCHRONIZATION

CROSS-REFERENCE TO RELATED APPLICATION

This application claims the benefit of U.S. Provisional Patent Application 61/147,776, filed Jan. 28, 2009, which is incorporated herein by reference.

FIELD OF THE DISCLOSURE

The present disclosure relates generally to computer networks, and particularly to synchronizing multiple real-time clocks over such networks.

BACKGROUND OF THE DISCLOSURE

Clock synchronization deals with the issue that internal clocks of several computers may differ. Even when initially set to the same time, internal clocks will differ after some time due to clock drift, which is caused by each clock counting time at a slightly different rate.

In a distributed computer system, in which multiple autonomous computers communicate via a computer network, clock synchronization is implemented by establishing a "global" time (i.e., a standard time among all computers in the network). After establishing the global time (also referred to herein as a "reference clock time"), the global time needs to be accurately maintained across all nodes of the computer network.

SUMMARY OF THE DISCLOSURE

There is thus provided, in accordance with an embodiment of the invention, a method for clock synchronization, including computing an offset value between a local clock time of a real-time clock circuit and a reference clock time, loading the offset value into a register that is associated with the real-time clock circuit, and summing the local clock time with the value in the register so as to give an adjusted value of the local clock time that is synchronized with the reference clock.

There is also provided in accordance with an embodiment of the invention, a real-time clock circuit, including a counter, which is configured to output a local clock time, a register, which is coupled to receive an offset value computed by a host processor, and an adder, which is configured to provide a new local clock time for input to the counter by periodically adding a fixed increment to the local clock time that is output by the counter and alternatively, after the host processor has written the offset value to the register, by summing the offset value from the register with the local clock time.

There is further provided in accordance with an embodiment of the invention, an apparatus, including a real-time clock circuit, which is configured to output a local clock time, and which comprises a register, which is coupled to receive an offset value, and an adder, which is coupled to sum the local clock time with the offset value in the register so as to give an adjusted value of the local clock time, and a host processor configured to compute the offset value between the local clock time and a reference clock time, and to load the offset value into the register.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
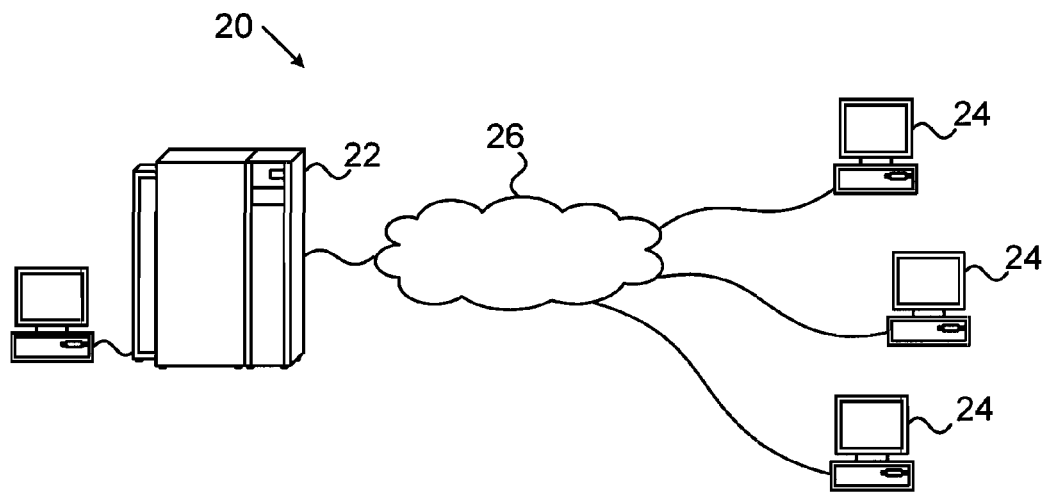
FIG. 1 is a schematic, pictorial illustration of a network synchronization system, in accordance with an embodiment of the present invention.

The following notation is used throughout the document:

| Term | Definition |
| --- | --- |
| CPU | Central Processing Unit |
| CQ | Completion Queue |
| NIC | Network Interface Card |
| PHY | Physical-Layer Interface |
| PTP | Precision Time Protocol |
| RQ | Receive Queue |
| SQ | Send Queue |
| TS | Time Stamp |

Overview

In computer networks, each node (such as a switch or endpoint) typically has its own real-time clock. In many applications, it is desirable that the real-time clocks of different nodes be precisely synchronized. Such synchronization can be difficult to achieve, however, due to the latency and jitter involved in distributing clock synchronization messages among the nodes.

The Precision Time Protocol (PTP) was conceived as a solution to this problem. PTP is defined in IEEE standard 1588-2002, which is incorporated herein by reference. This protocol enables network nodes, using messaging between the nodes and a master device, to determine the offset of their respective clocks to levels of accuracy in the nanosecond range. For maximum accuracy in measuring the clock offsets, hardware-based time stamping may be used, as described, for example, by Weibel and Bechaz in "Implementation and Performance of Time Stamping Techniques," 2004 Conference on IEEE 1588 (Sep. 28, 2004), which is incorporated herein by reference.

Although the time stamps may be applied in hardware, the actual computation of the clock offset may be carried out by a PTP application running in software on a host processor. Based on this computation, the software is able to calculate the correct time and adjust the local real-time clock accordingly. In software-driven processes on a conventional host computer, however, nanosecond-range accuracy of execution can be difficult or impossible to achieve. Therefore, even if the host processor is able to calculate the synchronized time very accurately, this accuracy may be lost due to the unpredictable delay between the decision of the host processor to set the real-time clock to a certain time and the precise time at which the real-time clock device receives the command. This problem could be overcome by implementing the PTP application in dedicated hardware, but this sort of solution can be costly and cumbersome.

An embodiment of the present invention, as described hereinbelow, provides a method and circuitry that enable a host processor to adjust a real-time clock with accuracy that is limited only by the clock frequency itself. The host processor determines the clock offset of its local real-time clock relative to a reference time value, using PTP or any other suitable protocol or measurement technique. The host processor then loads this offset value into a register. In one of its cycles following the load operation, the real-time clock sums the offset value with its own current clock value to give the next clock value. This operation can be performed using only minimal additional hardware in the real-time clock circuit. Because the load and sum operations are unsynchronized with one another, the clock value is adjusted accurately irrespective of software-related delays.

System Description

FIG. 1 is a schematic, pictorial illustration of a network synchronization system 20, in accordance with an embodiment of the present invention. The system comprises a master node 22 and one or more slave nodes 24, which communicate via a network 26, such as a local area network or internet. As discussed supra, although the nodes in system 20 are shown in FIG. 1 as host computers, in practice the nodes participating in the synchronization may include switches, as well as endpoints. The nodes and network may operate in accordance with any suitable communication protocol, such as Ethernet or InfiniBand™. For the purposes of the present embodiment, nodes 22 and 24 may comprise any sort of network element having a real-time clock. For the sake of simplicity in the description that follows, however, nodes 22 and 24 are assumed to be host computers, which exchange PTP messages over network 26 in order to synchronize the real-time clocks of the slave nodes to that of the master node.

Figure 2:
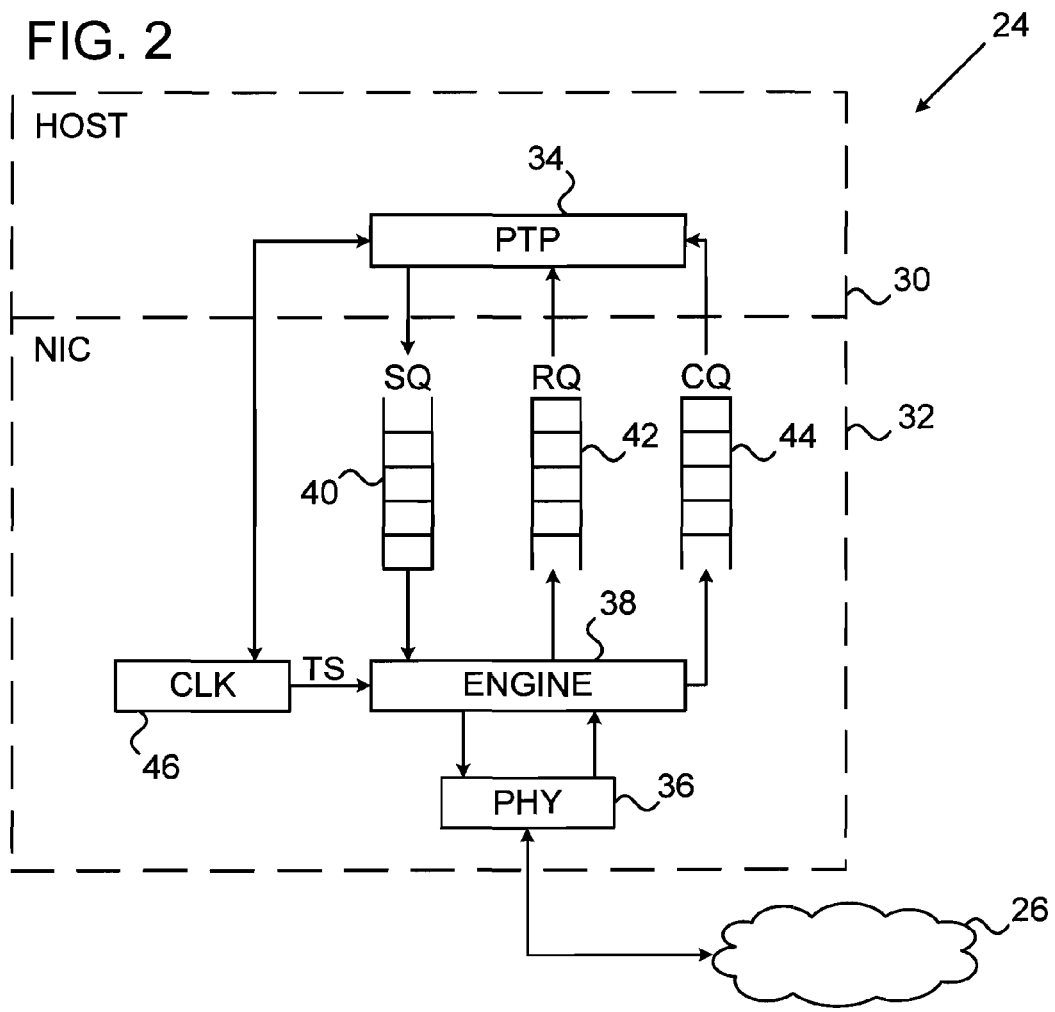
FIG. 2 is a block diagram that schematically shows details of a network node, in accordance with an embodiment of the present invention.

FIG. 2 is a block diagram that schematically shows details of one of slave nodes 24, in accordance with an embodiment of the present invention. Master node 22 may have a similar structure. This particular implementation of node 24 is shown here by way of example, as an aid to understanding the operation of the methods and circuits that are described below. The principles embodied in these methods and circuits, however, are in no way limited to the implementation of FIG. 2 and may be applied in other sorts of computers and other network nodes.

Node 24 comprises a host processor 30 and a network interface adapter, referred to for convenience as a network interface card (NIC) 32. The host processor runs various software processes, including a PTP application 34. This application is responsible for exchanging PTP messages with master node 22 and, based on these messages, providing adjustment input to a clock circuit 46. This clock circuit is assumed here to be a part of NIC 32, although it may alternatively be integrated with another part of the host computer.

NIC 32 is coupled via a physical-layer interface (PHY) 36 to network 26. A protocol engine 38 generates outgoing packets for transmission via PHY 36 over the network, and also processes incoming packets received from the network. PTP application 34 (like other host applications) places outgoing message transmission requests in a send queue (SQ) 40 for processing by engine 38, and reads incoming messages from a receive queue (RQ) 42. Upon successful completion of a messaging request, engine 38 places a completion report in a completion queue (CQ) 44, to be processed by the host application that submitted the request. This sort of NIC operation is common to many network interface devices, such as InfiniBand™ host channel adapters, and its details are beyond the scope of the present patent application.

Clock circuit 46 generates time stamps (TS) for purposes of the PTP time offset determination. Engine 38 records the time stamp for each outgoing PTP packet at the moment the packet begins to exit PHY 36 to network 26, and also stamps the arrival times of incoming PTP packets at PHY 36. Engine 38 places time-stamped packet transmission and reception reports in queues 42 and 44 for delivery to PTP application 34. The PTP application uses the time stamps to compute a clock adjustment offset, which it then loads into clock circuit 46, as is described in greater detail hereinbelow.

Clock Synchronization Communication Model

Figure 3:
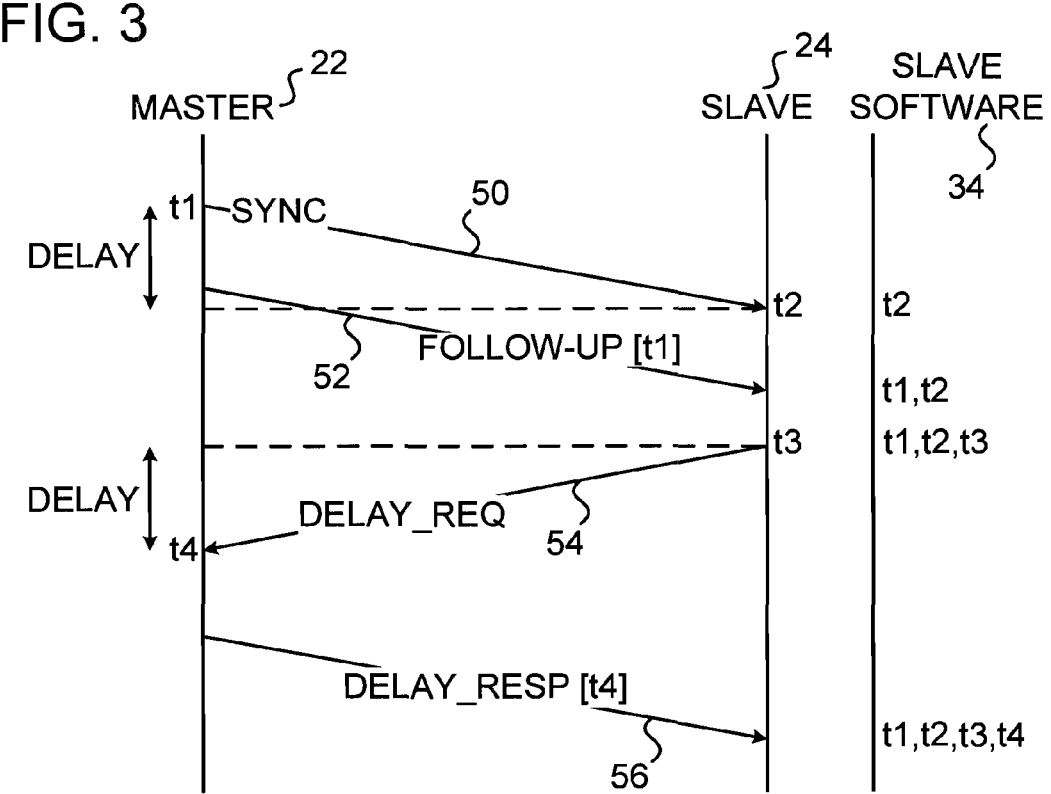
FIG. 3 is a communication flow diagram, which schematically shows messages that are used in finding a time offset between master and slave nodes, in accordance with an embodiment of the present invention.

FIG. 3 is a communication flow diagram, which schematically shows messages transmitted between master node 22 and slave node 24 for purposes of clock synchronization, in accordance with an embodiment of the present invention. The message flow in FIG. 3 follows the PTP model, but different message flows, as well as other means, may alternatively be used for measuring the clock offsets.

Master node 22 initially transmits a sync packet 50 to slave node 24. The master node records a time stamp value t/when it transmits packet 50, and the slave node records a time stamp value t2 at the moment it receives the packet via PHY 36. The master node next reports its own measured value of t1 to the slave node in a follow-up packet 52. The difference between t2 and t1 is equal to the sum of the network transmission delay and the offset (which may be positive or negative) between the master and slave node clocks, and can be expressed as $$t2-t1=O+D \tag{1}$$

wherein O is the offset and D is the transmission delay.

To measure the network transmission delay, slave node 24 transmits a delay request packet 54 to master node 22, and records a time stamp value t3 at the moment of transmission. Master node 22 records a time stamp value t4 when it receives this packet, and reports the value of t4 to the slave node in a delay response packet 56. The resulting transmission delay can be expressed as $$t4-t3=-O+D. \tag{2}$$

When calculating Equation 1, the analyzed transmissions are from the master to the slave. However, when calculating Equation 2, the analyzed transmission is from the slave to the master. It is assumed in the PTP model that the transmission delay from the host to a slave is equal to the transmission delay from the slave to the host.

By combining Equations 1 and 2, PTP application 34 then calculates the offset between the respective clocks of the master and slave nodes using the formula:

$$O=[(t2-t1)-(t4-t3)]/2 \tag{3}$$

A feature of the PTP model is that the master device periodically initiates an exchange of messages with slave devices, thereby enabling each slave clock to recompute the offset between its clock and the master clock. The offset between a slave and master clock will drift with time, and these periodic exchanges help improve synchronization.

Precise Clock Synchronization

Figure 4:
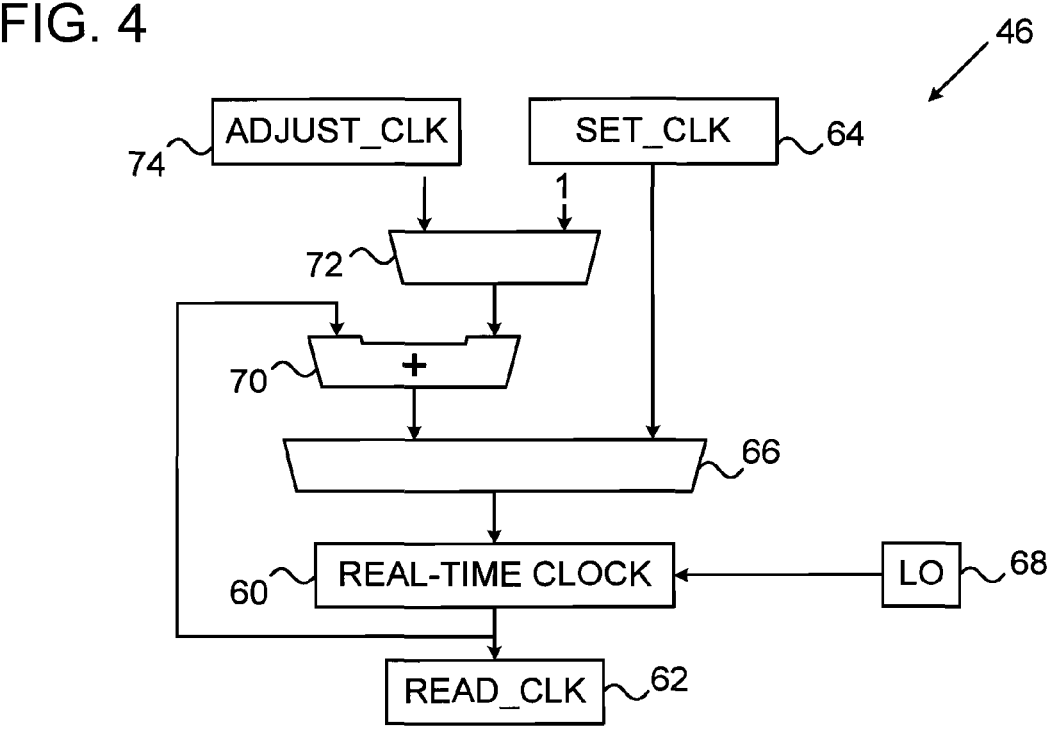
FIG. 4 is a block diagram that schematically shows details of a clock circuit, in accordance with an embodiment of the present invention.
Figure 5:
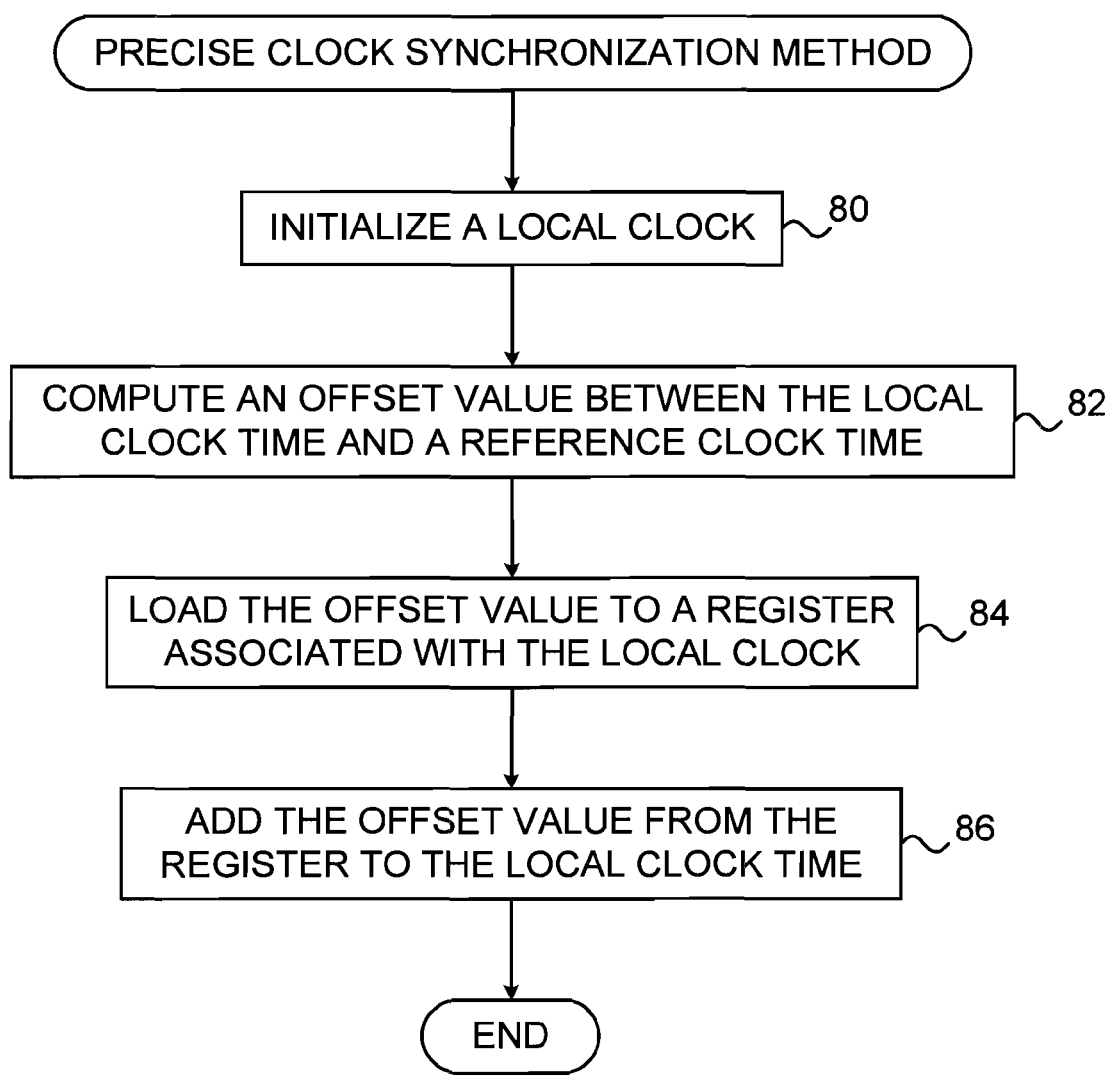
FIG. 5 is a flow diagram that schematically illustrates a precise clock synchronization method, in accordance with an embodiment of the present invention.

Reference is now made to FIGS. 4 and 5, which schematically illustrate an implementation of precise clock synchronization, in accordance with an embodiment of the present invention. FIG. 4 is a block diagram that schematically shows details of clock circuit 46, while FIG. 5 is a flow diagram that schematically illustrates a precise clock synchronization method.

Circuit 46 is built around a real-time clock 60, comprising a counter that is incremented at intervals indicated by pulses from a local oscillator (LO) 68 or other clock source. The period of the clock source is typically in the nanosecond range, for example, 4 ns. The real-time clock outputs time stamp values to a READ_CLK register 62.

Host processor 30 sets real-time clock 60 initially by writing a time value to a SET_CLK register 64 and then triggering a multiplexer 66 to load this value into the clock counter (step 80). Thereafter, at each clock cycle, an adder 70 increments the counter value by an increment amount that it receives from a multiplexer 72. The default setting of the multiplexer gives a default increment amount of 1.

After setting the initial clock value, node 22 carries out the sort of interaction shown above in FIG. 3 in order to calculate a clock offset value between the slave and master nodes (step 82). The host processor loads this offset value (which may be positive or negative) into an ADJUST_CLK register 74 and triggers multiplexer 72 to provide this value to adder 70 (step 84). Thus, at the next clock cycle, the real-time clock will be incremented not by 1, but rather by the calculated offset value, and will thus be reset precisely to the time of the master node (step 86).

When the host processor writes the current time to SET_CLK register 64, the resulting time count value in real-time clock 60 is likely to be inaccurate. The reason (as was noted briefly in the Overview above) is that the PTP application running on the host processor is typically one of many concurrent software processes, which share the resources of the central processing unit (CPU), memory and bus. There is therefore an unpredictable delay between the time at which the software decides to write a time value to register 64 and the actual time at which the register receives the value and multiplexer 66 is triggered.

On the other hand, when the host processor writes the offset value to ADJUST_CLK register 74, the delay incurred by the software in actually writing to the register is unimportant. The delay has no impact on the accuracy of the offset value (assuming the actual offset between the master and slave clocks changes relatively slowly). The software process of writing the offset value to register 74 is decoupled from the hardware process of updating the counter value of real-time clock 60, which occurs automatically at a later time that is determined by the hardware clock source. Thus, optimal clock accuracy is achieved using a simple, inexpensive hardware circuit.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description, but is not intended to be exhaustive or limiting to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

It is intended that the appended claims cover all such features and advantages of the disclosure that fall within the spirit and scope of the present disclosure. As numerous modifications and changes will readily occur to those skilled in the art, it is intended that the disclosure not be limited to the limited number of embodiments described herein. Accordingly, it will be appreciated that all suitable variations, modifications and equivalents may be resorted to, falling within the spirit and scope of the present disclosure.

The invention claimed is:

1. A method for clock synchronization, comprising:
computing an offset value between a local clock time of a real-time clock circuit and a reference clock time;
loading the offset value into a register that is associated with the real-time clock circuit; and
summing the local clock time with the value in the register so as to give an adjusted value of the local clock time that is synchronized with the reference clock,
wherein the local clock time is maintained by incrementing a counter at intervals determined by a clock source, and wherein summing the local clock time comprises adding the value in the register to the local clock time at one of the intervals, and
wherein the real-time clock circuit comprises an adder providing a summed output to the counter, and having a first adder input coupled to receive a clock output from the counter, and a second adder input coupled to a multiplexed output from a multiplexer, which has a first multiplexer input coupled to receive a default increment amount and a second multiplexer input coupled to receive the offset value from the register.

2. The method according to claim 1, wherein the local clock time is associated with a slave device and the reference clock time is provided by a master device coupled to the slave device via a network.

3. The method according to claim 2, wherein the slave device comprises:
a host processor which is configured to compute the offset value and load the offset value into the register; and
a network interface device comprising the real-time clock circuit.

4. The method according to claim 2, wherein computing the offset value comprises:
exchanging a first set of messages between the master device and the slave device to determine a first time difference comprising the offset value and a transmission delay;
exchanging a second set of messages between the master device and the slave device to determine a second time difference comprising the transmission delay; and
calculating the offset value based on the first and second time differences.

5. A real-time clock circuit, comprising:
a counter, which is configured to output a local clock time;
a register, which is coupled to receive an offset value computed by a host processor;
an adder, which is configured to provide a new local clock time for input to the counter by periodically adding a fixed increment to the local clock time that is output by the counter and alternatively, after the host processor has written the offset value to the register, by summing the offset value from the register with the local clock time; and
a multiplexer having a first multiplexer input coupled to receive a default increment amount and a second multiplexer input coupled to receive the offset value from the register and configured to provide a multiplexed output, wherein the adder has a first input coupled to receive the local clock time that is output by the counter and a second input coupled to the multiplexed output from the multiplexer.

6. The real-time clock circuit according to claim 5, and comprising a local oscillator coupled to output pulses to the counter so as to cause the counter to be incremented at intervals indicated by the pulses.

7. A real-time clock circuit, comprising:

a counter, which is configured to output a local clock time;

a register, which is coupled to receive an offset value computed by a host processor;

an adder, which is configured to provide a new local clock time for input to the counter by periodically adding a fixed increment to the local clock time that is output by the counter and alternatively, after the host processor has written the offset value to the register, by summing the offset value from the register with the local clock time;

a further register, which is coupled to receive an initial time value from a host processor, and a multiplexer, having a first multiplexer input coupled to receive the initial time value from the register, and a second multiplexer input coupled to receive the new local clock time from the adder, and configured to provide a multiplexed output to the counter.

8. An apparatus comprising:

a real-time clock circuit, which is configured to maintain and output a local clock time, and which comprises a counter, a clock source, a register, which is coupled to receive an offset value, an adder, which is coupled to sum the local clock time with the offset value in the register so as to give an adjusted value of the local clock time, and a multiplexer having a first multiplexer input coupled to receive a default increment amount and a second multiplexer input coupled to receive the offset value from the register and configured to provide a multiplexed output, wherein the adder has a first input coupled to receive the local clock time that is output by the counter and a second input coupled to the multiplexed output from the multiplexer and is configured to maintain the local clock time by incrementing the counter at intervals determined by the clock source, and alternatively adding the value in the register to the local clock time at one of the intervals; and a host processor configured to compute the offset value between the local clock time and a reference clock time, and to load the offset value into the register.

9. The apparatus according to claim 8, wherein the apparatus comprises a slave device, comprising the real-time clock circuit and the host processor, and the reference clock time is provided by a master device coupled to the slave device via a network.

10. The apparatus according to claim 9, wherein the slave device comprises a network interface device comprising the real-time clock circuit.

11. The apparatus according to claim 9, wherein the host processor is configured to exchange a first set of messages with the master device to determine a first time difference comprising the offset value and a transmission delay, to exchange a second set of messages with the master device to determine a second time difference comprising the transmission delay, and to calculate the offset value based on the first and second time differences.

* * * * *